March 2, 1937. T. LEWIS ET AL 2,072,600
SAFETY PARACHUTE ATTACHMENT FOR AIRPLANES
Filed Feb. 4, 1936   4 Sheets-Sheet 2
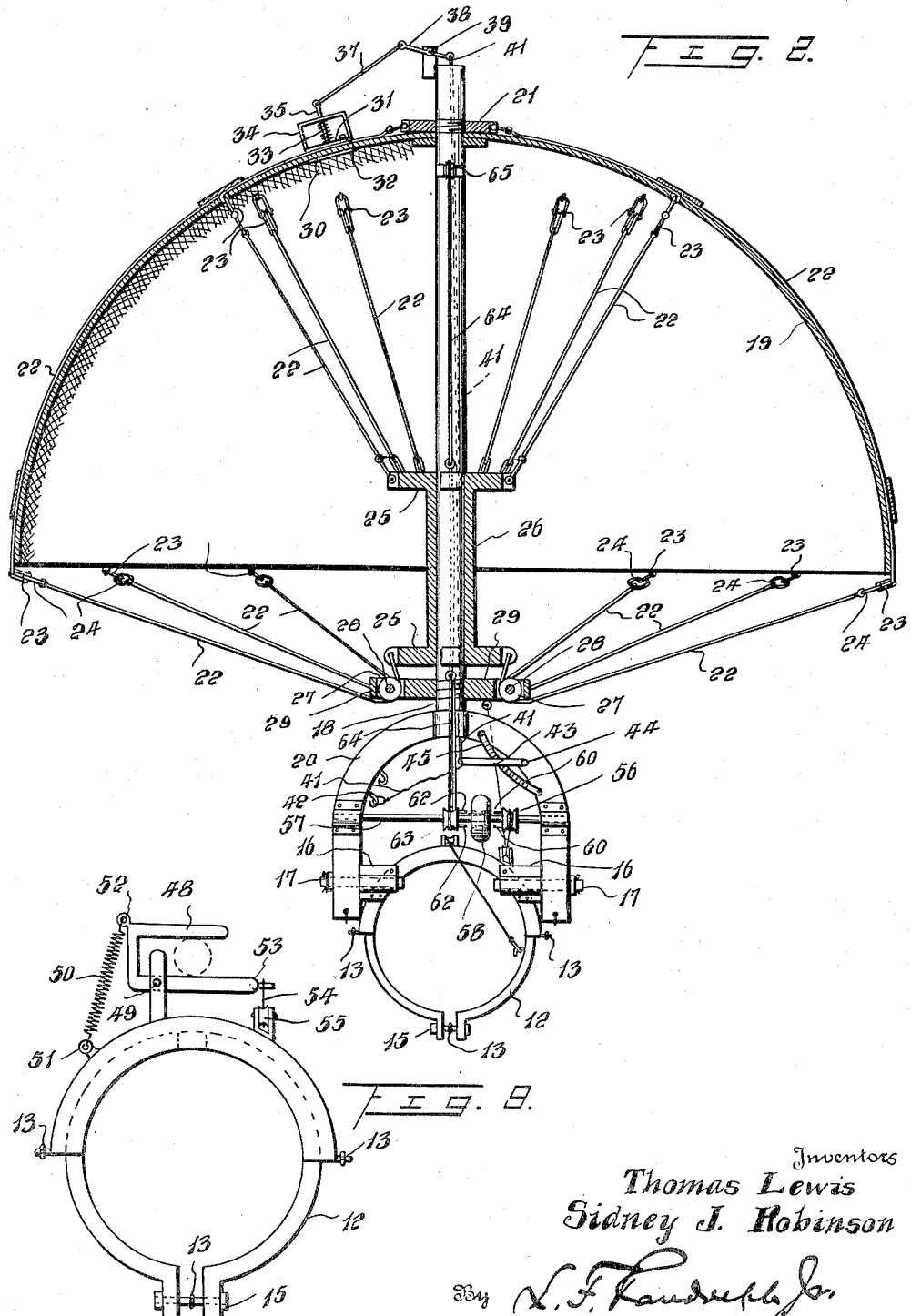
Inventors
Thomas Lewis
Sidney J. Robinson March 2, 1937.  T. LEWIS ET AL  2,072,600
SAFETY PARACHUTE ATTACHMENT FOR AIRPLANES
Filed Feb. 4, 1936  4 Sheets-Sheet 3
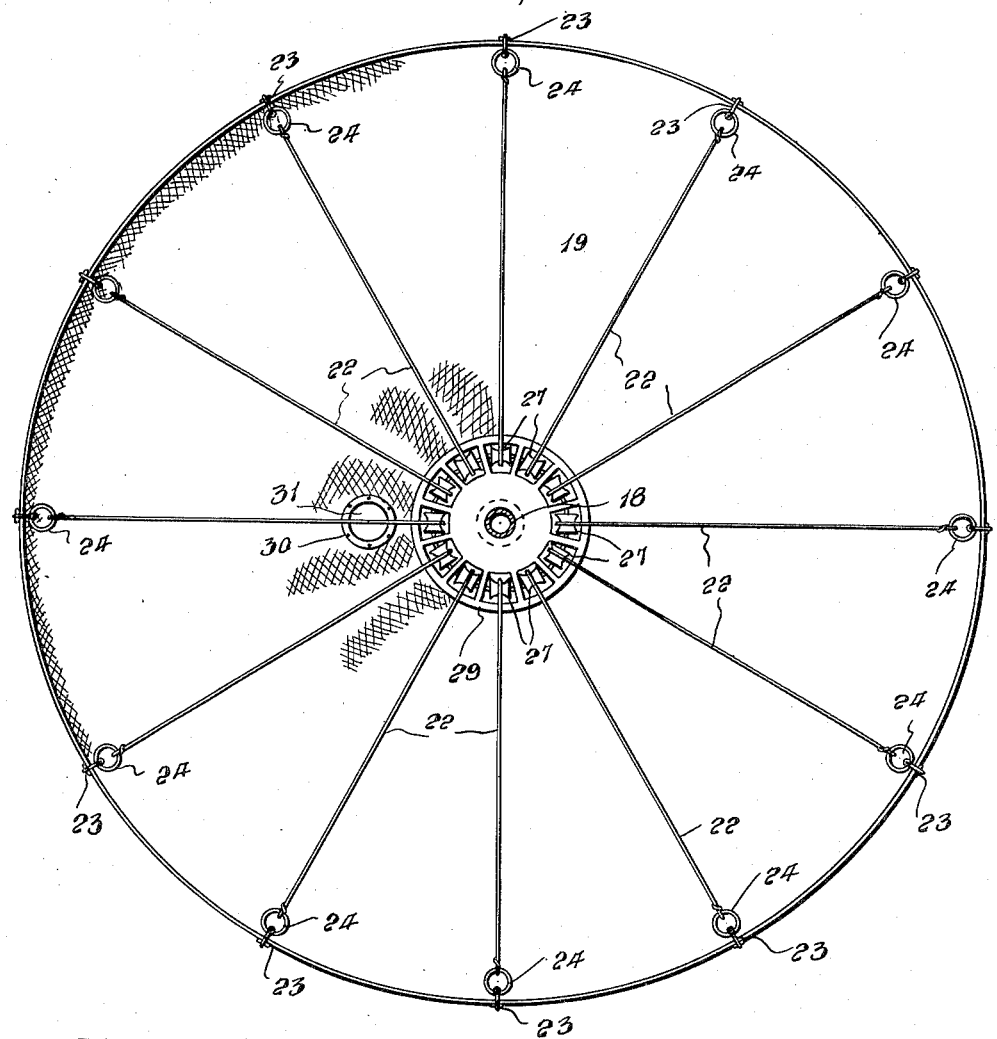
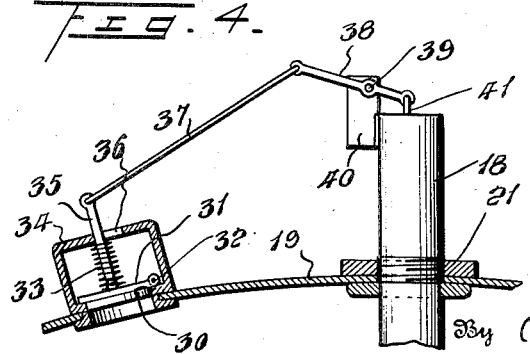
Inventors
Thomas Lewis
Sidney J. Robinson
Attorney

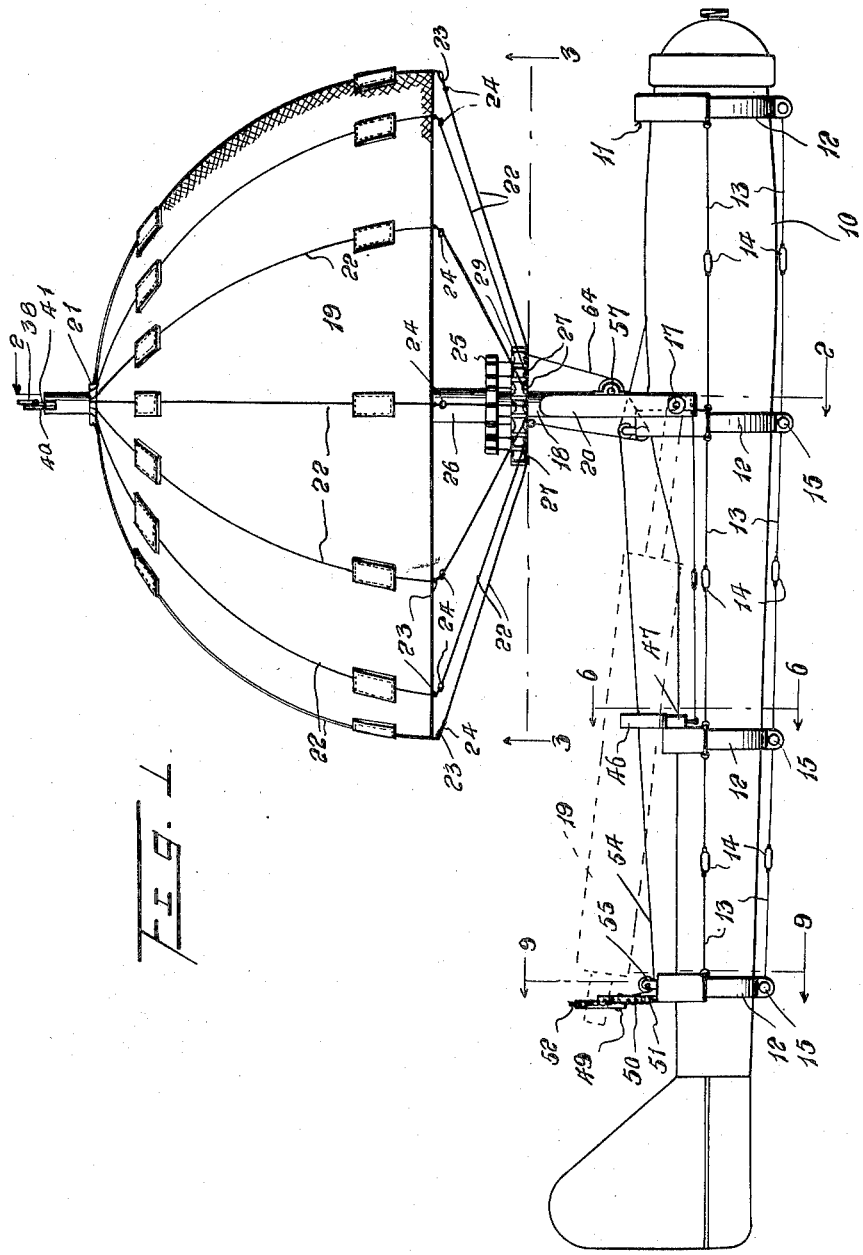

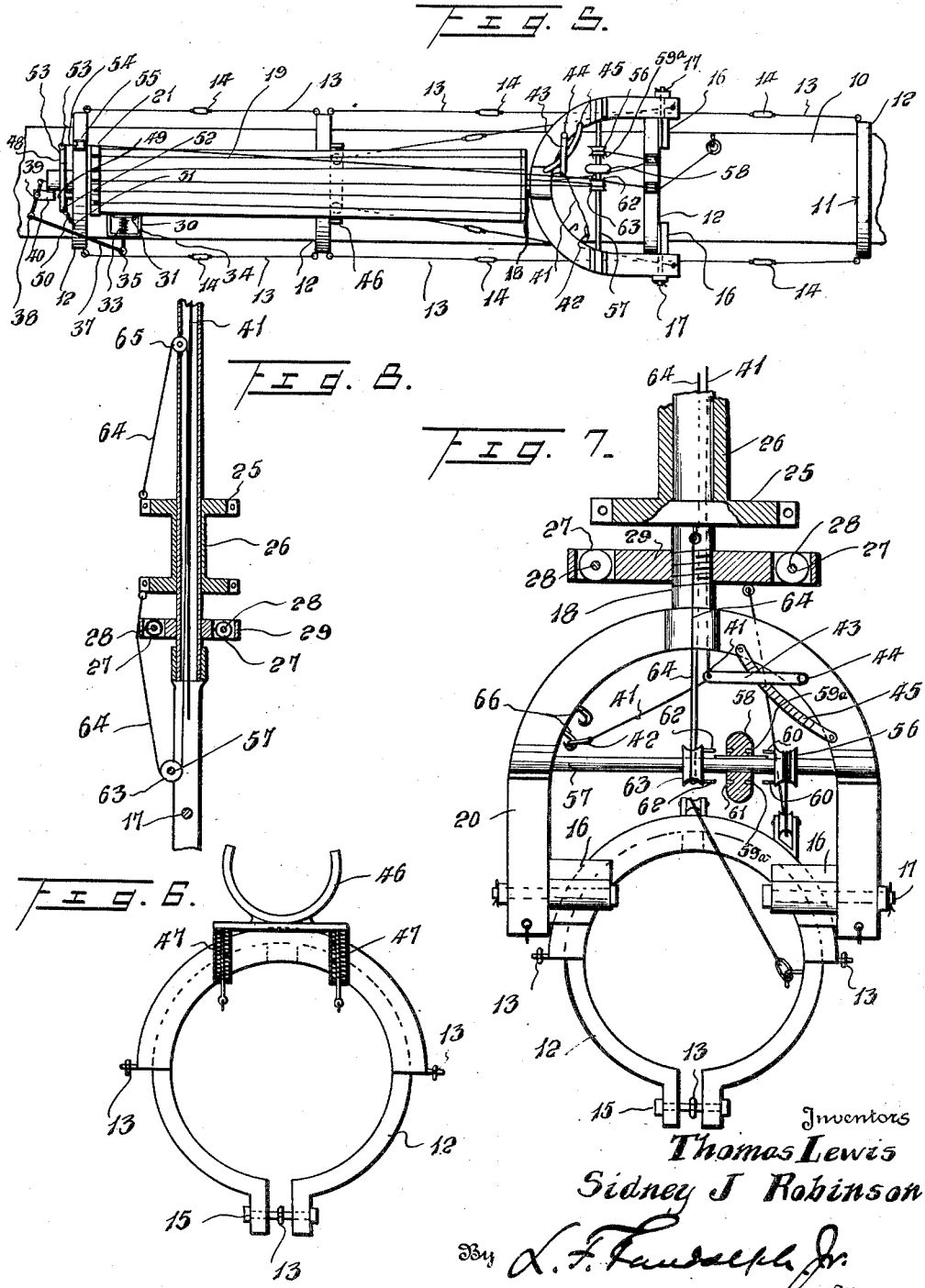

Patented Mar. 2, 1937

2,072,600

UNITED STATES PATENT OFFICE 2,072,600

SAFETY PARACHUTE ATTACHMENT FOR AIRPLANES

Thomas Lewis and Sidney J. Robinson, Mumford, N. Y.

Application February 4, 1936, Serial No. 62,340

4 Claims. (Cl. 244—139)

This invention relates to a safety parachute means capable of being built for attachment to any type of airplane for use in an emergency, to aid in a safe landing.

It is particularly aimed to provide a novel structure having a harness attachable to the fuselage of the airplane and with which the parachute is normally folded.

It is further aimed to provide a novel means whereby the parachute may be released in an emergency and also wherein same may be more effectively folded after an operation.

The more specific objects and advantages will become apparent from a consideration of the description following taken in connection with accompanying drawings illustrating an operative embodiment.

In said drawings:—

Figure 1 is a view in side elevation showing our improvement applied to an airplane;

Figure 2 is a vertical sectional view taken on the line 2—2 of Figure 1;

Figure 3 is a horizontal sectional view taken on the line 3—3 of Figure 1;

Figure 4 is a detailed elevation illustrating the connection for operating the air release valve;

Figure 5 is a plan view, partly broken away showing the attachment in place on an airplane;

Figure 6 is a cross sectional view taken on the line 6—6 of Figure 1;

Figure 7 is an enlarged elevation particularly showing the connection of the parachute proper to the harness;

Figure 8 is a fragmentary view partly in section, illustrating the cable means slidable part for affecting the collapse of the parachute and Figure 9 is a cross sectional view taken on the line 9—9 of Figure 1.

Referring specifically to the drawings, wherein like reference characters designate like or similar parts, 10 designates the fuselage of an airplane, which it is to be understood is to be taken as conventional, to which our improvements are adapted to be built for attachment to various styles, sizes and types thereof. In the present embodiment, a harness 11 is attached to the fuselage and it comprises a series of saddles or clamps 12, for instance four in number as shown. Such clamps are connected together by means of guy members 13, such as ropes or wires, which are maintained tight and relatively adjustable through the provision of turn buckles or the like 14 therein. Such clamps or saddles 12 are usually split, as best shown in Figure 6, and bolts 15 bridge the split.

The clamp or saddle adjacent the cockpit has bearings 16 in which king bolts 17 are journaled and which king bolts connect and pivotally mount a staff 18 of a parachute 19, the bolts engaging adjacent the terminals of a bifurcation 20 at the base of the staff 18.

Said parachute body 19 may be the usual collapsible textile fabric material, which is centrally anchored in any suitable manner as at 21 to the staff. Flexible cords or guy members at 22 are connected to the parachute 19 by means of clevises 23 and rings 24 or in any other suitable manner and to flanges 25 at opposite ends of a slidable spool or the like 26, mounted on the staff 18. A lower series of elements 22, are trained over guy pulleys 27, pivoted at 28, in a disc 29 rigidly fastened to the staff 18. It will be realized that when the spool 26 is moved upwardly, as in Figure 2, the upper series of cords 22 will slacken while the lower series of such cords will be pulled to aid in collapsing the parachute.

As best shown in Figure 4, the parachute body 19 has a frame 30 mounted therein, normally closed by a valve 31, pivoted to the frame as at 32 and urged into closed position by an expansive coil spring 33, engaging the valve at one end and a yoke 34 at the other end, which yoke is fastened to frame 30. A rod 35 is fastened to the valve 31, passes through spring 33 and through an opening 36 in said yoke. A cord or link 37 is pivotally connected to the rod 35 and to a lever 38 pivoted at 39 to a block 40 at the upper end of the staff 18. A flexible draw member or rope 41 is connected to the lever 38, and passes downwardly through the staff 18, which is hollow, and terminates in a ring 42, accessible from the cockpit of the fuselage. Intermediate the ends, cord 41 is fastened to a lever 43, pivoted at 44 to the bifurcated portion 20, and which lever is guided by a bracket 45 fastened to such bifurcated portion.

In normal flights, the parachute is folded and maintained in a lowered position against the upper portion of the fuselage, resting in a rack 46, mounted in any suitable way on the adjacent saddle or clamp 12, and including expansible coil springs 47 normally urging the rack or yoke 46 away from the clamp. The outer end of the staff 18 is retained by a hook 48 as shown in Figure 9. Such hook is preferably of U-shape as shown being pivoted at 49 to the adjacent clamp 12. The hook 48 is urged to open position by a contractile spring 50, fastened at 51 to the adjacent clamp 12 and at 52 to the hook 48. One end of such hook or one leg thereof is longer than at the other as at 53 and a cable or other flexible element 54 is connected thereto which cable is trained over suitable guy pulleys 55, fastened to adjacent clamp 12 and is fastened at the opposite end to a pulley 56. The longer leg of hook 48 engages under the staff 18 of the parachute so that when operated by element 54, to release the staff, said longer leg of the hook will urge the staff towards upright position, assisted by the springs 47 under the yoke or rack 46.

The pulley 56 is rotatably mounted on a stationary shaft or rod 57, fastened to the bifurcated portion 20 of the staff 18, and is normally maintained immovable so as to maintain the hook 46 in a position shown in Figure 9 with the parachute retracted. In order to hold the pulley 56 from rotation for the purpose stated, a slidable element 58 is keyed at 59 on the shaft 57 so as to be non-rotatable, although slidable, and such element 58 has recesses 59a on one side thereof which receive pins 60 on one face of the pulley 56.

Should the slide 58 be moved to the left in Figure 2, while the parachute is folded, as in the case of an emergency, the pulley 56 will be released and hence the spring 50 will swing the hook 48 and the staff 18 will be released, air rushing beneath the parachute, will inflate it and move it to the sustaining position shown in Figures 1 and 2. When thus extended, the slide 58 may be moved further to the left in Figure 2 so that recesses 61 on one side thereof will engage pins 62 on another pulley 63 rotatably mounted on said shaft 57. Over pulley 63 a cable or flexible element 64 is trained, opposite ends of which are fastened to the flanges 25 of spool 26 as best shown in Figure 8, a suitable guy pulley or pulleys being provided for such cable 64 as at 65. The pulley 63 after being manually turned to position the spool to correspond with the inflated condition of the parachute, may be secured in that position through the engagement of recesses 61 of slide 58 with the aforesaid pins 62 of pulley 63.

Prior to folding or collapsing the parachute following an emergency use thereof, a cable 41 from the cockpit of the airplane is drawn downwardly to effect the opening of the valve 31, since it tilts lever 48, draws element 37 and raises rod 35. This pulling action is effected through the depression of lever 43, following which the ring 42 is engaged with a suitable hook means 66 carried by the bifurcated portion 20. Air may readily escape from beneath the parachute to facilitate folding, with the valve 31 thus opened. Thereupon the pulley 63 is turned, when detached from the slide 58, to the spool 26 upwardly through the action of cable 64, thus folding or collapsing the parachute, after which the ring 42 is detached from hook means 66. In this condition, the parachute is reengaged with the hook 48, as shown in Figure 9 and so maintained after manual winding of the pulley 56 through a subsequent fastening through inter-engagement of the pin 60 thereof with the recesses 59 of slide 58.

Various changes may be resorted to provided they fall within the spirit and scope of the invention.

We claim as our invention:—

1. A device of the class described comprising harness, a staff having a bifurcated portion pivoted to the harness, a parachute connected to the staff, a spool slidable along the staff, a series of flexible elements connected to the spool and to the parachute, a fixed guy means on the staff over which one of the series of flexible elements passes, means operable to slide the spool to facilitate collapse of the parachute, comprising a cable attached at both ends to the spool, a pulley over which said cable passes, a shaft on which the pulley is loosely mounted, elements slidable and non-rotatable on said shaft, and inter-engaging means between said pulley and said elements.

2. A device of the class described comprising harness, a staff having a bifurcated portion pivoted to the harness, a parachute connected to the staff, spool slidable along the staff, a series of flexible elements connected to the spool and to the parachute, a fixed guy means on the staff over which one of the series of flexible elements passes, means operable to slide the spool to facilitate collapse of he parachute, comprising a cable attached at both ends to the spool, a pulley over which said cable passes, a shaft on which the pulley is loosely mounted, elements slidable and non-rotatable on said shaft, and inter-engaging means between said pulley and said elements, latch means engageable with the staff to maintain the same retracted, a draw element connected to the latch means, a pulley loose on said shaft to which the draw element is also fastened, and inter-engaging means between the last mentioned pulley and said slidable element.

3. A device of the class described comprising harness, a staff having a bifurcated portion pivoted to the harness, a parachute connected to the staff, spool slidable along the staff, a series of flexible elements connected to the spool and to the parachute, a fixed guy means on the staff over which one of the series of flexible elements passes, means operable to slide the spool to facilitate collapse of the parachute, comprising a cable attached at both ends to the spool, a pulley over which said cable passes, a shaft on which the pulley is loosely mounted, element slidable and non-rotatable on said shaft, and inter-engaging means between said pulley and said elements, latch means engageable with the staff to maintain the same retracted, a draw element connected to the latch means, a pulley loose on said shaft to which the draw element is also fastened, and inter-engaging means between the last mentioned pulley and said slidable element, said parachute having a normally closed air-release valve, and a draw element operable to open said valve.

4. A device of the class described comprising harness, a staff having a bifurcated portion pivoted to the harness, a parachute connected to the staff, spool slidable along the staff, a series of flexible elements connected to the spool and to the parachute, a fixed guy means on the staff over which one of the series of flexible elements passes, means operable to slide the spool to facilitate collapse of the parachute, comprising a cable attached at both ends to the spool, a pulley over which said cable passes, a shaft on which the pulley is loosely mounted, element slidable and non-rotatable on said shaft, and inter-engaging means between said pulley and said elements, latch means engageable with the staff to maintain the same retracted, a draw element connected to the latch means, a pulley loose on said shaft to which the draw element is also fastened, and inter-engaging means between the last mentioned pulley and said slidable element, said parachute having a normally closed air-release valve, and a draw element operable to open said valve, said element passing through the staff, and means on the staff to operate the last mentioned draw element and to fasten it in valve-opening position.

THOMAS LEWIS.
SIDNEY J. ROBINSON.